Aug. 8, 1933.                E. L. GOLTRY                1,922,001
                            SPRING STRUCTURE
                           Filed July 8, 1932
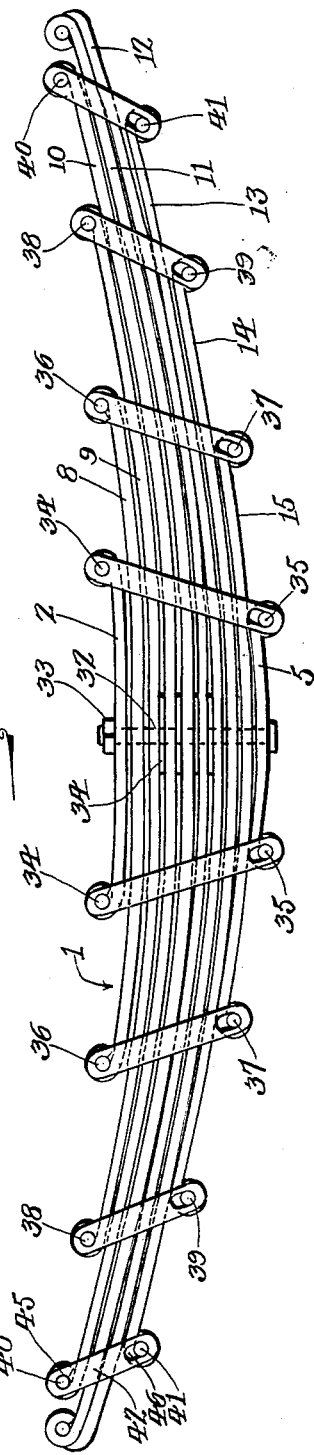
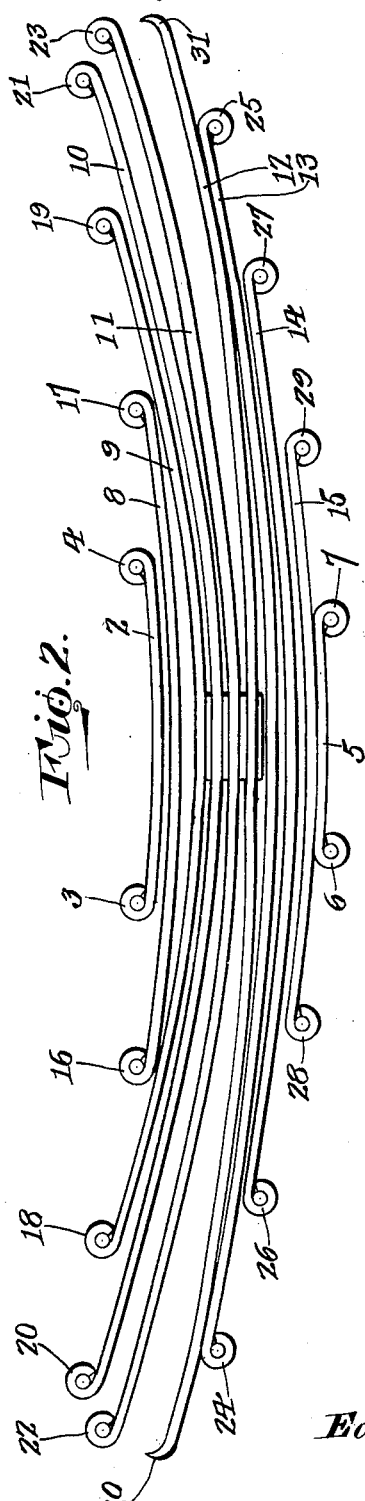
Inventor
Edwin L. Goltry
By Geo. P. Kimmel
Attorney Patented Aug. 8, 1933 1,922,001

UNITED STATES PATENT OFFICE 1,922,001

SPRING STRUCTURE

Edwin L. Goltry, Red Oak, Iowa

Application July 8, 1932. Serial No. 621,457

4 Claims. (Cl. 267—47)

This invention relates to a spring structure for use in connection with vehicles, and has for its object to provide, in a manner as hereinafter set forth, a spring of the laminated type for limiting or checking the flexing thereof to materially increase its life without impairing the cushioning function thereof.

A further object of the invention is to provide, in a manner as hereinafter set forth, a spring structure of the laminated type including links for maintaining the laminations or leaves of the structure in superposed relation, and with the variation in the angle at which the links are set in relation to the plane of the spring and to each other checking or limiting the flexing of the spring structure without impairing the cushioning action of the latter.

A further object of the invention is to provide, in a manner as hereinafter set forth, a spring structure of the laminated type having as a part thereof means whereby its flexing in both directions, one direction downwardly and one direction upwardly can be arrested whereby the life of the structure is materially enhanced without impairing the cushioning action of the latter.

Further objects of the invention are to provide, in a manner as hereinafter set forth, a spring structure of the laminated type for the purpose referred to, which is simple in its construction and arrangement, strong, durable, compact, thoroughly efficient in its use, readily assembled, and comparatively inexpensive to manufacture.

To the above ends essentially and to others which may hereinafter appear, the invention consists of such parts, and such combination of parts which fall within the scope of the invention as claimed.

In the drawing:—

Figure 1 is a side elevation of the spring structure.

Figure 2 is a view similar to Figure 1 with the laminations of the structure arranged in superposed relation and disconnected.

The spring structure shown includes a body part 1 formed of a series of superposed laminations, each being upon a different arc.

The body part 1 includes a top lamination 2 having its ends provided with eyes 3, 4 and a bottom lamination 5 having ends formed with eyes 6, 7. The lamination 2 is of greater length than lamination 5 and is arranged above the latter. The laminations 2 and 5 are disposed at the center of body part 1, and lamination 5 is so arranged with respect to lamination 2, that the latter will project an equal distance from and with respect to the eyes 6, 7.

The body part 1 also includes laminations 8, 9, 10, 11, 12, 13, 14 and 15 arranged in superposed relation. The lamination 8 is arranged directly below and is of greater length than lamination 2 and also of greater length than lamination 15, the latter is arranged directly over and being of greater length than lamination 5. The lamination 9 is arranged directly below and is of greater length than lamination 8 and also of greater length than lamination 14, the latter is arranged directly over and being of greater length than lamination 15. The lamination 10 is arranged directly below and is of greater length than lamination 9 and also of greater length than lamination 13, the latter is arranged directly over and being of greater length than lamination 14. The lamination 11 is arranged directly below and is of greater length than lamination 10 and also of greater length than lamination 13, the latter is arranged directly over and being of greater length than lamination 14. Interposed between laminations 11 and 13 is a lamination 12 of greater length than the latter and of a length substantially the same as lamination 11.

Eyes 16, 17 are at the ends of lamination 8; eyes 18, 19 are at the ends of lamination 9; eyes 20, 21 are at the ends of lamination 10; eyes 22, 23 are at the ends of lamination 11; eyes 24, 25 are at the ends of lamination 13; eyes 26, 27 are at the ends of lamination 14 and eyes 28, 29 are at the ends of lamination 15. The eyes on the laminations 2, 8, 9, 10 and 11 extend upwardly with respect to the upper faces of such laminations. The eyes on the laminations 13, 14, 15 and 5 extend downwardly with respect to the lower faces of such laminations. The lamination 12 is not provided with eyes at the ends thereof, but has its ends upcurved as at 30, 31 to snugly engage or seat against a peripheral part of the eyes 22, 23 respectively of the lamination 11.

Extending through the laminations, centrally thereof is a headed bolt 32 carrying a securing nut 33. The latter coacts with the former for connecting the laminations together. Fibre washer 34 is interposed between laminations 9, 10, between laminations 10, 11, between laminations 11, 12 and between laminations 12, 13. The washers are disposed centrally with respect to laminations 9, 10, 11, 12 and 13. The bolt 32 extends through the washers.

The eyes of the lamination 11 are adapted to be coupled to perches or other suspension means in a known manner. The perches or suspensions are not shown.

With respect to Figure 1, the spring structure is shown as including two sets of pairs of coupling links, one set being disposed at an obtuse angle and the other at an acute angle with respect to the plane of body part 1 for arresting the flexing of the latter downwardly only.

The links of each pair are disposed in parallelism. Each link has an opening at its top and a lengthwise disposed slot at its bottom. The length of the slot is materially greater than the diameter of an opening. The links of each pair are arranged to oppose opposite sides of the body part 1. One set of links is arranged adjacent to one side and the other set adjacent the other side of the vertical median of the body part 1. The links of each set incline inwardly toward the vertical median of said body part.

As illustrated with respect to Figure 1, each set of links comprises four pair of links.

With reference to Figure 1, the laminations 2 and 5 carry coupling elements 34, 35 respectively employed for connecting the inner pair of links of each set with said laminations. The eyes of laminations 8 and 15 carry coupling elements 36, 37 respectively for connecting an intermediate pair of links of each set to said laminations. The eyes of laminations 9 and 14 carry coupling elements 38, 39 for connecting another intermediate pair of links of each set to said laminations. The eyes of the laminations 10 and 13 carry coupling elements 40, 41 for connecting the outer pair of links of each set to said laminations.

The links are designated 42. Each of said links has an opening 45 at its upper end and a slot 46 at its lower end. The coupling elements extend from the ends of the eyes. The coupling elements 34, 36, 38 and 40 are mounted in the openings 45 at the upper ends of the links. The coupling elements 35, 37, 39 and 42 are mounted in the slots 46 at the lower ends of the links. The coupling members are connected to the links in any suitable manner. Although the links are arranged in pairs, but one of the links of each pair is shown. The pairs of links of each set decrease in length from the inner to the outer end of the set. That is to say, the inner pair of links of a set is of greater length than that of the outer pair. One pair of intermediate links of a set is of less length than that of the inner pair of the set and of greater length than that of the other intermediate pair of the set. The outer pair of links of a set is of less length than any of the other pairs of the set. The links of a pair are of like length.

The links 42 in connection with the barrels and coupling elements function to limit flexing of body part 1 only on the downward movement of the latter. The limiting of the flexing of the body part 1 prevents the breaking or distorting of the laminations thereby increasing the life of the structure, and such control relative to flexing is had without impairing the cushioning action of the structure.

What I claim is:—

1. In a spring structure, a body part formed of superposed laminations, spaced elements arranged adjacent each side and on opposite sides of the vertical axis of said body part for limiting the flexing of the latter, the said elements being inclined with respect to the vertical axis of said body part and arranged in pairs, the elements of each pair being disposed in parallelism, means for pivotally connecting the upper ends of said elements to the ends of all of the laminations arranged above the longitudinal center of said body part, and means for pivotally and slidably connecting the said elements to the ends of all of the laminations arranged below the longitudinal center of the body part.

2. In a spring structure, a body part formed of superposed laminations, spaced elements arranged adjacent each side and on opposite sides of the vertical axis of said body part for limiting the flexing of the latter, the said elements being inclined with respect to the vertical axis of said body part and arranged in pairs, the elements of each pair being disposed in parallelism, means for pivotally connecting the upper ends of said elements to the ends of all of the laminations arranged above the longitudinal center of said body part, and means for pivotally and slidably connecting the said elements to the ends of all of the laminations arranged below the longitudinal center of the body part, the elements located on each side of the vertical axis of said body part inclining inwardly towards said axis.

3. In a spring structure, a body part formed of a series of superposed laminations, said laminations progressively increasing in length from the top and bottom of said body part to the longitudinal center thereof, spaced upstanding elements arranged adjacent each side and on opposite sides of the axis of the body part for limiting the flexing of the latter and arranged in pairs, the elements of each pair being disposed in parallelism, means for pivotally connecting the upper ends of said elements to the ends of all of the laminations arranged above the longitudinal center of said body part, said elements having their lower ends slotted, and means coacting with the slots in said elements for pivotally and slidably connecting the lower ends of said elements to the ends of all of the laminations below said longitudinal center.

4. In a spring structure, a body part comprising an intermediate lamination, an upper set of superposed laminations arranged over said intermediate lamination and a lower set of superposed laminations arranged below said intermediate lamination, spaced links located adjacent each side and on opposite sides of the vertical axis of said body part and arranged in pairs, the links of each pair being disposed in parallelism, the laminations of each of said sets progressively decreasing in length from said intermediate lamination, means for pivotally connecting the upper ends of said links to the ends of the laminations of said upper set, said links having their lower ends provided with slots, and means coacting with said slots for pivotally and slidably connecting the lower ends of said elements to the ends of the laminations of the lower set.

EDWIN L. GOLTRY.